C. E. RENSHAW & C. H. JENKINS.
CAUTIONARY TELLTALE.
APPLICATION FILED JUNE 28, 1912.
1,134,698.
Patented Apr. 6, 1915.
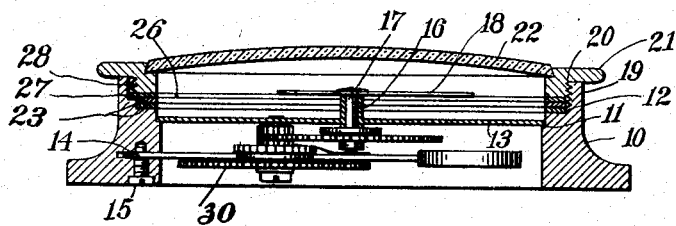
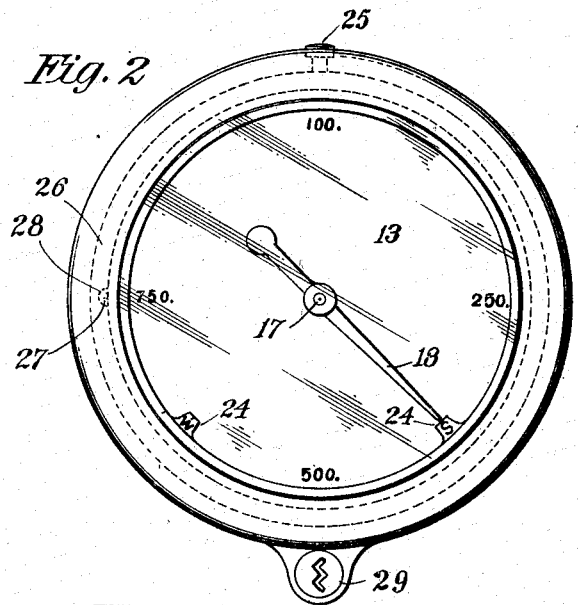
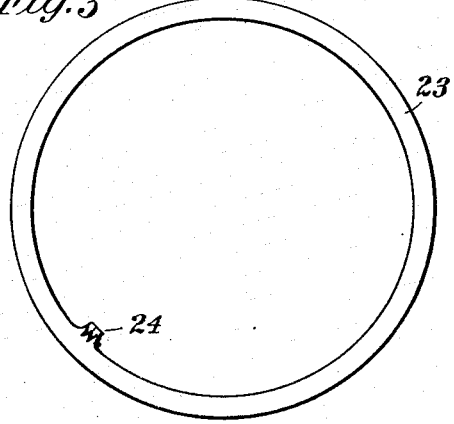
Witnesses:
Wm Rohleber
B. L. Sandman
Inventors
C. E. Renshaw
C. H. Jenkins
By his Attorneys
Kerr Page Cooper & Hayward
THE NORRIS PETERS CO., PHOTO-LITHO., WASHINGTON, D. C.

UNITED STATES PATENT OFFICE.

CHARLES E. RENSHAW, OF EAST ORANGE, AND CHARLES H. JENKINS, OF BELLEVILLE, NEW JERSEY, ASSIGNORS TO NEWMAN CLOCK COMPANY, OF NEW YORK, N. Y., A CORPORATION OF NEW YORK.

CAUTIONARY TELLTALE.

1,134,698. Specification of Letters Patent. Patented Apr. 6, 1915.

Application filed June 28, 1912. Serial No. 706,350.

*To all whom it may concern:*

Be it known that we, CHARLES E. RENSHAW and CHARLES H. JENKINS, residing at East Orange and Belleville, respectively, in the county of Essex and State of New Jersey, have invented certain new and useful Improvements in Cautionary Telltales, of which the following is a full, clear, and exact description.

The invention which forms the subject matter of this application relates to a cautionary tell-tale the principal object of which is to prevent the use of a fraudulent or spurious key to indicate a number of rounds made by a watchman when no such round or rounds were actually made by him.

In the orthodox form of watchman's time detectors of the portable type a record is produced upon a paper dial by means of impressions produced by registering keys, such impressions upon the dial serving to indicate the hour and minute at which the different stations are visited by the watchman. Such a method, however, does not record any difference in registrations between genuine keys, which are securely attached to the various parts of the building or are located at different stations, and the application or use of a spurious key which the watchman has fraudulently obtained and which can be used by him to make the impressions upon the paper dial without actually performing his duty. Moreover, the watchman's time detector is usually in the custody of an employee, and not the owner himself, who may be careless or unscrupulous in making a careful examination of the paper dial to ascertain, upon its removal, whether or not the requisite number of indicatons are impressed upon the dial. In other words the prevailing rule, according to the dictates of good supervision, requires the watchman to make a survey or round once each hour during the night beginning at six o'clock in the evening so that when the dial is removed in the morning a complete record of the registrations of each survey or round, which he has made, should appear. It has been found that not infrequently a watchman will make only eleven complete rounds or surveys during the night, and owing to the similarity of the records of the eleven complete rounds, when carelessly compared with one containing twelve rounds, it is at once apparent that the employee in charge may be readily and easily deceived.

With a view to overcome the objections above noted I have produced a tell-tale having a movable indicating device in combination with an adjustable point for determining the attainment of a desired indication. The tell-tale is provided with a means operated by the wave motions of the body to actuate the indicating device. The watchman in making each hourly round or survey takes about the same number of steps and a corresponding number of wave motions are imparted to the apparatus to actuate the indicating device. Now unless his duty be actually performed there would be few or no body wave motions imparted to the detector to actuate the indicating device. The number of body wave motions imparted to the detector when carried by the watchman in making his hourly rounds or surveys varies but little, so that if the body wave motions be counted a similar total of motions will be made each night, and which if indexed upon a dial will at once show whether or not the watchman has actually made the full number of hourly surveys or rounds, and which, if read in connection with the key registrations upon a paper dial of a detector, to which the tell-tale is suitably connected, will prove that a fraudulent key has not been used.

Further objects and advantages will appear from the detailed description below, taken in connection with the accompanying drawings in which—

Figure 1 shows a sectional view of the device; Fig. 2 a plan view; and Fig. 3 a detail showing one of the index rings removed from the case.

In more detail, 10 is the body portion of the tell-tale which is adapted to be fastened in any suitable manner to a watchman's time detector.

The interior of the casing is shouldered at 11 and 12 and on the former is rigidly carried in any suitable manner a plate 13 which serves as a support for any desired form of wave motion registering device. The pendulum for the registering device is supported at 14 by means of the screw 15. The plate 13 has extending from it the tubular bearing 16, through which the shaft 17 of the registering device passes, said shaft being provided with an indicating device 18, on the upper end thereof, preferably in the form of an arrow, but obviously other forms may be used. At its lower end the shaft 17 has secured thereto a gear wheel 29, which meshes with suitable gearing to rotate the pointer 18 when the pendulum is actuated by the wave body motions incident to the travel of the watchman when carrying the device. The pinion 30, located under the pendulum arm, is adapted to actuate any well known counting means, not shown. The plate 13 may be provided at its outer periphery if desired with divisions or characterizing indicia which denote or indicate the number of body wave motions that have been made. The wave motions of different watchmen varies considerably, hence these divisions are not indispensable.

The part 19 of the body portion is internally screw-threaded as shown at 20. A bezel 21, having a shoulder to receive the circular glass plate 22, is screw-threaded externally at its lower end to fit the internal screw-threads on the body portion. Upon the shoulder 12 a plurality of adjustable index rings 23 are employed which have points thereon to determine the attainment of a desired indication. These points are indicated at 24 having any suitable characterizing indicia thereon. When the cap 21 is screwed into place and the index rings 23 properly adjusted the latter are securely clamped between the screw-threaded portion of said cap and the shoulder 12. The index ring having the designation "W" thereon serves to check the watchman in making his rounds or surveys during the week the movable indicating device being adjustable back to zero each day by the manipulation of the thumb-member 25. The details of this feature are old and well known hence we do not show the same. Several desiderata will have to be taken into consideration in order to properly adjust this characterizing point for each individual watchman but this has nothing to do with the novelty of the invention. The index ring having the designation "S" thereon serves to check the watchman in making his rounds on Sunday the number of said rounds on this day usually exceeding the number of rounds made during the week.

At 26 we show a ring located upon the upper ring 23 and provided with a projection 27 adapted to enter in or register with a slot 28 in the body portion or casing. The purpose of this ring is to avoid any possible displacement of the index rings which would otherwise result in screwing the bezel in place to clamp the index rings between the said bezel and the shoulder upon which they are supported.

At 29 (Fig. 2) we show diagrammatically an escutcheon of a lock which serves to prevent the unauthorized removal of the bezel from the body portion of the tell-tale, and thereby avoid the fraudulent adjustment of the index rings by the watchman.

It will be seen from the above that any number of index rings may be used corresponding to different times, etc., but ordinarily two will suffice. After the position of the ring has been once determined for certain rounds to be made by any particular watchman, it can be readily ascertained, by glancing at the tell-tale, whether or not the position of the arrow indicator coincides or substantially coincides with the adjusted position of the projection on the index ring. If they do, a cursory glance at the time dial sheets is necessary to show whether or not the watchman is faithful. If a discrepancy exists on the tell-tale a careful examination should be made of the time sheets and if desired an investigation may be made to determine whether or not the watchman is using spurious keys to produce the time record.

It is obvious that minor details may be resorted to without departing from the true scope and spirit of our invention.

What we claim is:

1. A tell tale comprising a body portion having an internal shoulder therein, an indicator located within said body portion, means therein for supporting said indicator, an adjustable member supported upon the said internal shoulder of said body portion having means thereon to indicate the attainment of a desired indication, and means connected to said body portion adapted to hold the said adjustable member in adjusted relation.

2. A tell tale comprising a body portion screw threaded at the upper side and having an internal shoulder therein, a movable indicating device supported in said body portion, an adjustable index located upon the internal shoulder of said body portion, a bezel for the said tell tale adapted to be screw threaded to said body portion and to hold the adjustable index in adjusted relation, and means for preventing movement of the adjustable index as the bezel is screwed on to said body portion.

3. A tell-tale comprising, in combination, a movable indicating device, a closure therefor, and a plurality of independently adjustable rings in said closure, having indicia thereon for determining the attainment of desired indications.

4. A tell-tale comprising a movable indicating device, a body portion provided with an internal shoulder, a bezel connected to said body portion the interior end of said bezel and said shoulder defining an interior circumferential groove, and an index located in said groove and adjustable to different positions for determining the attainment of desired indications.

5. A tell-tale, comprising a body portion having a plurality of shoulders progressively arranged therein and interiorly screw-threaded at its upper portion, a supporting member adapted to be supported upon the bottom shoulder, a movable indicating device supported by said body portion, a plurality of revoluble rings having laterally extending lugs serving as indicators supported upon the upper shoulders in the body portion, a bezel for said telltale screw-threaded to said body portion and adapted to keep the revoluble rings in adjustment, a central opening in the supporting member, means passing through the said opening in said supporting member and engaging with the indicating device to operate the same, and means for preventing movement of the index as the bezel is screwed on to said body portion.

In testimony whereof we affix our signatures in the presence of two subscribing witnesses.

CHARLES E. RENSHAW.
CHARLES H. JENKINS.

Witnesses:
H. C. PARADIS,
M. M. DALY.

Copies of this patent may be obtained for five cents each, by addressing the "Commissioner of Patents, Washington, D. C."